United States Patent
Roberts et al.

(10) Patent No.: US 11,486,348 B2
(45) Date of Patent: Nov. 1, 2022

(54) WIND TURBINE BLADE WITH FLATBACK SEGMENT AND RELATED METHOD

(71) Applicant: LM WIND POWER US TECHNOLOGY APS, Kolding (DK)

(72) Inventors: David Roberts, HE Amsterdam (NL); Michael Wenani Nielsen, Kolding (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 876 days.

(21) Appl. No.: 16/319,041

(22) PCT Filed: Jul. 12, 2017

(86) PCT No.: PCT/EP2017/067608
§ 371 (c)(1),
(2) Date: Jan. 18, 2019

(87) PCT Pub. No.: WO2018/015250
PCT Pub. Date: Jan. 25, 2018

(65) Prior Publication Data
US 2021/0372365 A1 Dec. 2, 2021

(30) Foreign Application Priority Data

Jul. 19, 2016 (EP) ..................................... 16180110

(51) Int. Cl.
*F03D 1/06* (2006.01)
*B29C 70/42* (2006.01)
(Continued)

(52) U.S. Cl.
CPC ............ *F03D 1/0675* (2013.01); *B29C 70/42* (2013.01); *B29C 70/68* (2013.01); *F03D 1/0633* (2013.01);
(Continued)

(58) Field of Classification Search
CPC .... F03D 1/0633; F03D 1/0641; F03D 1/0675; F03D 1/0683; F05B 2240/301;
(Continued)

(56) References Cited

U.S. PATENT DOCUMENTS 9,492,973 B2 * 11/2016 Datta .................... B29C 66/543
2015/0267681 A1 * 9/2015 Ruijter .................. F03D 1/0691
415/208.2

(Continued)

FOREIGN PATENT DOCUMENTS

CN 104696167 A 6/2015
CN 105593517 A 5/2016
(Continued)

OTHER PUBLICATIONS

Machine Translation of EP 3,299,613 A1, Retrieved from ESPACENET on Oct. 19, 2021.*
(Continued)

*Primary Examiner* — Courtney D Heinle
*Assistant Examiner* — Sang K Kim
(74) *Attorney, Agent, or Firm* — Nath, Goldberg & Meyer; Jerald L. Meyer; Tanya E. Harkins

(57) ABSTRACT

An optical analysis device for determining particulate matter includes three light sources having different wavelengths, an apparatus for combining the three transmitted light beams on a common optical path, a measurement volume, an optical axis in the forward scattering direction that defines the scattering angle 0°, a light absorption apparatus at 0° that absorbs unscattered light, and six detectors arranged at different specified angles which are as close as possible to 0° directly next to the light absorption apparatus, at a second scattering angle between 7° and 40°, at a third scattering angle between 41° and 70°, at a fourth scattering angle between 71° and 115°, at a fifth scattering angle between (Continued)

Figure 1:
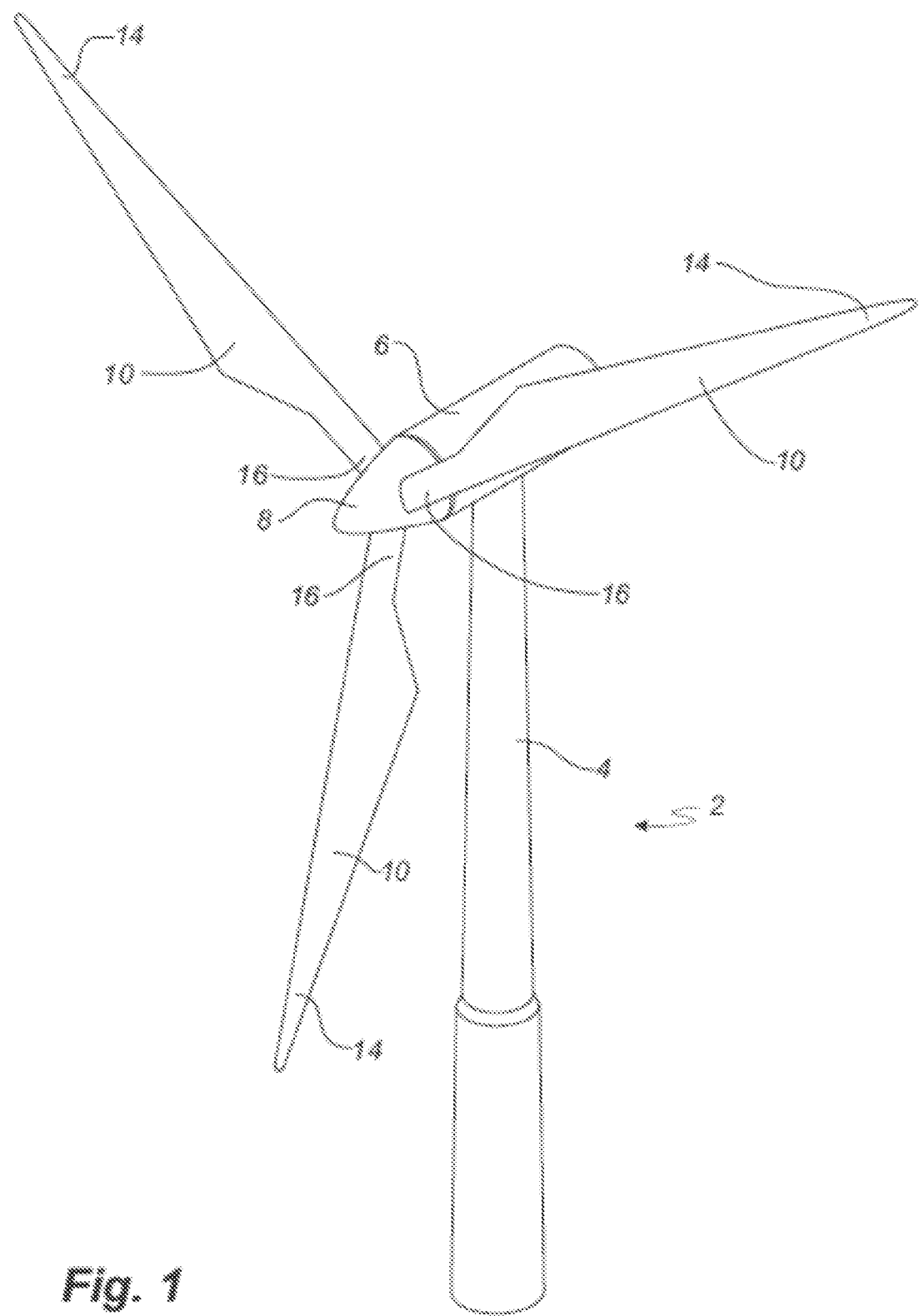

116° and 145°, at a sixth scattering angle between 146° and 180°. A control and evaluation unit controls the light sources such that the scattered light is detected in a wavelength selective manner by the detectors.

13 Claims, 8 Drawing Sheets

(51) Int. Cl.
*B29C 70/68* (2006.01)
*B29L 31/08* (2006.01)

(52) U.S. Cl.
CPC ..... *B29L 2031/085* (2013.01); *F05B 2230/23* (2013.01); *F05B 2240/303* (2020.08); *F05B 2240/304* (2020.08)

(58) Field of Classification Search
CPC ............ F05B 2240/304; F05B 2230/23; F05B 2240/303; B29C 70/42; B29C 70/68; B29L 2031/085
See application file for complete search history.

(56) References Cited

U.S. PATENT DOCUMENTS

| 2015/0316028 A1* | 11/2015 | Brekenfeld | F03D 1/0675 |
| | | | 156/196 |
| 2019/0291365 A1* | 9/2019 | Roberts | F03D 1/0675 |
| 2020/0318605 A1* | 10/2020 | Burchardt | F03D 1/0675 |

FOREIGN PATENT DOCUMENTS

| DE | 10 2014 203 936 A1 | 9/2015 | | |
| EP | 2 104 785 A2 | 9/2009 | | |
| EP | 3299613 A1 * | 3/2018 | ........... | F03D 1/0675 |
| EP | 3708825 A1 * | 9/2020 | ........... | F03D 1/0675 |
| KR | 10-1520898 B1 | 5/2015 | | |

OTHER PUBLICATIONS

International Search Report dated May 10, 2017 issued in corresponding International Application No. PCT/EP2017/067608.
Office Action dated Mar. 11, 2020 issued in corresponding European Application No. 17737820.5.
Chinese Fourth Office Action dated Sep. 13, 2021 corresponding to application No. 2017800447892.

* cited by examiner

WIND TURBINE BLADE WITH FLATBACK SEGMENT AND RELATED METHOD

This is a National Phase Application filed under 35 U.S.C. 371 as a national stage of PCT/EP2017/067608, filed Jul. 12, 2017, an application claiming the benefit of European Application No. 16180110.5, filed Jul. 19, 2016, the content of each of which is hereby incorporated by reference in its entirety.

TECHNICAL FIELD

The present disclosure pertains to the field of manufacturing wind turbine blades. In particular, the present disclosure relates to a wind turbine blade and/or a method of manufacturing a wind turbine blade.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Then, the two halves are glued together, often by means of internal flange parts. Glue is applied to the inner face of the lower blade half before the upper blade half is lowered thereon. Additionally, one or two reinforcing profiles (beams) are often attached to the inside of the lower blade half prior to gluing to the upper blade half.

The aerodynamic shell parts are typically made by use of Vacuum Assisted Resin Transfer Moulding (VARTM), where a plurality of fibre mats are arranged on top of a rigid mould parts and possibly also a core material to provide parts having a sandwich structure. When the fibre mats have been stacked and overlapped so as to form the 25 final shape of the wind turbine blade shell part, a flexible vacuum bag is arranged on top of the fibre mats and sealed against the rigid mould part, thereby forming a mould cavity containing the fibre mats. Resin inlets and vacuum outlets are connected to the mould cavity. First the mould cavity is evacuated via the vacuum outlets so as to form an underpressure in the mould cavity, after which a supply of liquid resin is supplied via the resin inlets. The resin is forced into the mould cavity due to the pressure differential and impregnates the fibre material of the fibre mats. When the fibre material has been fully impregnated, the resin is cured in order to form the final composite structure, i.e. the blade shell part.

Wind turbine blades comprising a flatback section are known in the art and have shown to contribute to an increased AEP and being easier to transport. However, to incorporate flatback sections in wind turbine blades has shown to be a challenging task.

SUMMARY OF THE INVENTION

Accordingly, there is a need for systems and methods that will improve the quality of wind turbine blades with flatback profile sections (or at least decrease the risk of errors occurring).

Accordingly, there is provided a wind turbine blade extending from a root end to a tip end along a longitudinal axis and comprising a root region, a transition region, and an airfoil region, the wind turbine blade comprising a profiled contour with a leading edge and a trailing edge and a chord extending between the leading edge and the trailing edge; a blade shell with a first blade shell part with a pressure side and a second blade shell part with a suction side, the first and second blade shell parts extending from the root end to the tip end and joined along a trailing edge glue joint; a first main spar cap integrated in the first blade shell part; a second main spar cap integrated in the second blade shell part; and one or more shear webs connected between the first main spar cap and the second main spar cap. One or both of the first blade shell part and the second blade shell part comprises a shell core arranged between an inner laminate and an outer laminate, wherein the shell core comprises a bend having a bend angle, e.g. of at least 45 degrees or at least 60 degrees, between a first part of the shell core and a second part of the shell core.

Also provided is a method of manufacturing a wind turbine blade extending from a root end to a tip end along a longitudinal axis and comprising a root region, a transition region, and an airfoil region, the wind turbine blade comprising a profiled contour with a leading edge and a trailing edge and a chord extending between the leading edge and the trailing edge, a blade shell with a pressure side and a suction side, a first main spar cap integrated in the pressure side of the blade shell, a second main spar cap integrated in the suction side of the blade shell, and one or more shear webs connected between the first main spar cap and the second main spar cap. The method comprises arranging an outer reinforcement material for an outer laminate in a mould shell; arranging a shell core on the outer reinforcement material, wherein arranging a shell core comprises forming a bend having a bend angle, e.g. of at least 45 degrees or at least 60 degrees, between a first part of the shell core and a second part of the shell core; arranging an inner reinforcement material for an inner laminate on the shell core; adding resin to the inner reinforcement material and/or the outer reinforcement material; and curing the resin.

Further, there is provided a blade shell part for a pressure side and/or a suction side of a wind turbine blade, the blade shell part extending from the root end to the tip end with a glue surface for a trailing edge glue joint, the blade shell part comprising a main spar cap integrated in the blade shell part, wherein the blade shell part comprises an inner laminate, an outer laminate, and a shell core arranged between the inner laminate and the outer laminate, wherein the shell core comprises a bend having a bend angle, e.g. of at least 45 degrees or at least 60 degrees, between a first part of the shell core and a second part of the shell core.

It is an advantage of the present method and wind turbine blade that the amount of structural glue can be reduced by enabling flatback sections on the wind turbine blade without the need for an additional glue joint in a cross-section. Further, the present disclosure provides a reduced need for a third web or other flapwise bending blade stiffeners or buckling stiffeners.

Further, by combining flatback edge reinforcement in a single blade shell part, a wind turbine blade with improved or higher bending stiffness is provided. The wind turbine blade optionally comprises an integrated blade shell part joint and flatback profile transition in order to minimize the number of structural adhesive joints needed.

The disclosed wind turbine blade and method advantageously reduce the number of required post-moulding external reinforcement layers or over-laminations and reduce the risk of processing defects.

A wind turbine blade extends from a root end to a tip end along a longitudinal axis and comprises a root region, a transition region, and an airfoil region. The transition region of the wind turbine blade part optionally comprises a shoulder defining a maximum chord of the wind turbine blade.

The method and/or systems advantageously relate to manufacture of wind turbine blades, e.g. having a blade length of at least 40 metres, or at least 45 metres, or even at least 50 metres. The wind turbine blades may be prebent, e.g. so that, when mounted on an upwind configured horizontal wind turbine in a non-loaded state, they will curve forward out of the rotor plane so that the tip to tower clearance is increased. A wind turbine blade has a tip end and a root end with an inner surface and an outer surface. The inner surface of a wind turbine blade or a blade shell part is a surface that is not exposed to the surroundings when the wind turbine blade has been assembled. The outer surface of a wind turbine blade of a blade shell part is a surface that is exposed to the surroundings when the wind turbine blade has been assembled.

The wind turbine blade comprises a profiled contour with a leading edge and a trailing edge and a chord extending between the leading edge and the trailing edge.

The wind turbine blade has a blade shell and comprises a first blade shell part with a pressure side and a second blade shell part with a suction side, the first and second blade shell parts extending from the root end to the tip end and joined along a trailing edge glue joint. The blade shell comprises a first main spar cap integrated in the first blade shell part; a second main spar cap integrated in the second blade shell part; and one or more shear webs, such as a primary shear web and/or a secondary shear web. The one or more shear webs are optionally connected between the first main spar cap and the second main spar cap.

The first blade shell part may comprise a shell core arranged between an inner laminate and an outer laminate. The shell core of the first blade shell part is also denoted the first shell core. The first shell core may comprise a bend, e.g. having a bend angle of at least 45 degrees or at least 60 degrees between a first part of the first shell core and a second part of the first shell core. The bend of the first blade shell part is also denoted the first bend. The bend angle of the first bend is also denoted the first bend angle. The first bend may be arranged within a distance from the trailing edge measured along the chord, wherein the distance from the trailing edge is less than 0.2*c, where c is the chord length.

The second blade shell part may comprise a shell core arranged between an inner laminate and an outer laminate. The shell core of the second blade shell part is also denoted the second shell core. The second shell core may comprise a bend having a bend angle, e.g. of at least 45 degrees or at least 60 degrees between a first part of the second shell core and a second part of the second shell core. The bend of the second blade shell part is also denoted the second bend. The bend angle of the second bend is also denoted the second bend angle. The second bend may be arranged within a distance from the trailing edge measured along the chord, wherein the distance from the trailing edge is less than 0.2*c, where c is the chord length.

The wind turbine blade exhibits improved strength in a flatback profile transition or flatback edge using a single continuous sandwich core (shell core) with a bend.

In one or more exemplary wind turbine blades, both the first shell core and the second shell core comprise a bend, i.e. the first shell core comprises a first bend and the second shell core comprises a second bend. In one or more exemplary wind turbine blades, only the first shell core or the second shell core comprises a bend, i.e. the first shell core comprises a first bend or the second shell core comprises a second bend. In exemplary blade shell parts, such as the first blade shell part and/or the second blade shell part, the bend angle of the bend may be in the range from 80 degrees to 100 degrees, e.g. at least in a first cross-section and/or in a second cross-section. The first bend may have a first angle of at least 75 degrees. The first bend may have a first bend angle in the range from 80 degrees to 100 degrees, such as about 90 degrees. The second bend may have a second bend angle of at least 75 degrees. The second bend may have a second bend angle in the range from 80 degrees to 100 degrees, such as about 90 degrees.

The second part of the shell core, e.g. the first shell core and/or the second shell core, may at least in a first cross-section and/or a second cross-section form a part of a flatback section at the trailing edge. The second part of the shell core may comprise a straight (i.e. flat) portion and/or a concave portion. The straight portion may have a height larger than $0.05*t_{max}$, such as larger than $0.2*t_{max}$, where $t_{max}$ is the maximum thickness of the wind turbine blade in the respective cross-section perpendicular to the longitudinal axis.

The second part of the shell core may at least in a first cross-section and/or a second cross-section have a height of at least 0.4*HF, such as at least 0.6*HF, where HF is the height of the flatback section in the respective cross-section. The second part of the shell core having a large height relative to the flatback section height improves the strength of the flatback section.

The bend, e.g. the first bend of the first shell core and/or the second bend of the second shell core, may have a sufficiently large inner radius enabling a blade shell part with relatively large distance between the inner laminate and the outer laminate. On the other hand, it may be desirable to make a "sharp" bend due to flatback considerations including flatback aero/AEP contributions. Thus, in one or more exemplary wind turbine blades or blade shell parts, a bend, e.g. the first bend of the first shell core and/or the second bend of the second shell core, may have an inner radius less than 300 mm such as less than 200 mm. A bend, e.g. the first bend of the first shell core and/or the second bend of the second shell core, having an inner radius in the range from 3 mm to 150 mm may be advantageous. In one or more exemplary wind turbine blades, the first bend of the first shell core and/or the second bend of the second shell core may have an inner radius in the range from 10 mm to 100 mm. In one or more exemplary wind turbine blades, the bend, e.g. first bend of the first shell core and/or second bend of the second shell core may have an inner radius in the range from 1 mm to 3 mm.

The bend, e.g. the first bend of the first shell core and/or the second bend of the second shell core may have a sufficiently large outer radius enabling a blade shell part with relatively large distance between the inner laminate and the outer laminate. On the other hand, it may be desirable to make a "sharp" bend due to flatback considerations. Thus, in one or more exemplary wind turbine blades, the bend, e.g. the first bend of the first shell core and/or the second bend of the second shell core, may have an outer radius less than 300 mm such as less than 200 mm. A bend, e.g. the first bend of the first shell core and/or the second bend of the second shell core, having an outer radius in the range from 3 mm to 150 mm may be advantageous. In one or more exemplary wind turbine blades, the first bend of the first shell core and/or the second bend of the second shell core may have an inner radius in the range from 10 mm to 100 mm.

The wind turbine blade or a blade shell part, such as the first blade shell part and/or the second blade shell part, may comprise a filling insert. The filling insert may be arranged between the shell core (first and/or second shell core) and the outer laminate at the bend. A filling insert provides and/or enables a sharp pointed flatback edge in turn optimizing aerodynamics. A filling insert provides and/or enables a sharp pointed flatback edge with a reduced need for a sharp bend of the shell core. Further, the filling insert enables a flatback section edge or flatback profile transition close to 90 degrees, e.g. to improve aerodynamics, for example in case that winglets are not used.

The first blade shell part may comprise a filling insert. The filling insert of the first blade shell part is also denoted the first filling insert. The second blade shell part may comprise a filling insert. The filling insert of the second blade shell part is also denoted the second filling insert.

The filling insert, e.g. the first filling insert and/or the second filling insert, may have a wedge-shaped cross-section perpendicular to the longitudinal direction. A first side of the filling insert, e.g. the first filling insert and/or the second filling insert, may face the shell core of the respective blade shell part. The first side of the shell core may be fitted to the outer surface of the shell core. For example, the first side of the shell core may be concave and follow the outer surface of the shell core, e.g. the outer surface of the bend. A second side of the filling insert may form at least a part of a flatback section at the trailing edge. In other words, the second side of the filling insert, e.g. the first filling insert and/or the second filling insert, may face the trailing edge of the wind turbine blade. The second side of the filling insert, e.g. the first filling insert and/or the second filling insert, may at least in a first cross-section and/or a second cross-section have a height in the range from 0.05*HF to 0.4*HF, where HF is the height of the flatback section in the respective cross-section. The filling insert, e.g. the first filling insert and/or the second filling insert, may have a third side facing the suction side or the pressure side of the wind turbine blade. For example, the third side of the second filling insert may face the suction side of the wind turbine blade. In one or more exemplary wind turbine blades, the third side of the first filling insert may face the pressure side of the wind turbine blade. The second side and the third side of a filling insert, e.g. the first filling insert and/or the second filling insert, may form an angle in the range from 60 degrees to 160 degrees. The angle between the second side and the third side is measured as the angle between a second side normal of the second side and a third side normal of the third side. The second side and the third side of a filling insert, e.g. the first filling insert and/or the second filling insert, may provide an edge, such as a sharp edge, such as at an intersection between the second side and the third side.

A filling insert, e.g. the first filling insert and/or the second filling insert, may comprise or be made from a material selected from a thermoplastic or thermoset polymer, a composite material, such as a glass fiber reinforced polymer, a foamed polymer material, and balsa wood or any combination thereof.

The wind turbine blade or a blade shell part, such as the first blade shell part and/or the second blade shell part, may comprise a bend stiffener. The bend stiffener may be arranged on the inner laminate of a blade shell part having a bend, e.g. the first blade shell part or the second blade shell part. The bend stiffener may comprise a first stiffener part. The first stiffener part may comprise a first end portion and a second end portion with an intermediate portion between the first end portion and the second end portion. The first end portion may be attached to a first inner laminate portion of the inner laminate, the first inner laminate portion partly covering the first part of the shell core with the bend. The second end portion may be attached to a second inner laminate portion of the inner laminate, the second inner laminate portion partly covering the second part of the shell core with the bend. In one or more exemplary wind turbine blades/blade shell parts, the bend stiffener is glued to the inner laminate and/or co-infused with the inner laminate. The first stiffener part may be straight/plane or curved. A curved first stiffener part may facilitate attachment to an inner laminate and/or obviate the need for glue flanges at respective end portions.

The bend stiffener may comprise a primary stiffener part, e.g. having a first end portion attached to the first end portion of the first stiffener part. The primary stiffener part or at least part thereof may be attached to the first inner laminate portion of the inner laminate, the first inner laminate portion partly covering the first part of the shell core with the bend.

The bend stiffener may comprise a secondary stiffener part, e.g. having a first end portion attached to a second end portion of the primary stiffener part. The secondary stiffener part or at least part thereof may be attached to the second inner laminate portion of the inner laminate, the second inner laminate portion partly covering the second part of the shell core with the bend. The secondary stiffener part may have a second end portion attached to the second end portion of the first stiffener part. The bend stiffener may have a wedge-shaped cross-section.

The bend stiffener may comprise a first glue flange at the first end portion of the first stiffener part or on the primary stiffener part. The bend stiffener may comprise a second glue flange at the second end portion of the first stiffener part or on the secondary stiffener part. The bend stiffener may comprise a first glue surface at the first end portion of the first stiffener part and/or on the primary stiffener part. The bend stiffener may comprise a second glue surface at the second end portion of the first stiffener part and/or on the secondary stiffener part.

The bend stiffener may comprise or be made from a material selected from a thermoplastic or thermoset polymer, a composite material, such as a glass fiber reinforced polymer, a foamed polymer material, and balsa wood or any combination thereof. The bend stiffener may be arranged to provide an air space between the first stiffener part, e.g. the intermediate portion of the first stiffener part, and an inner laminate portion of the inner laminate at the bend.

A bend stiffener strengthens and stiffens the bend of a blade shell part and enables more efficient handling of prying moments and buckling. Further, a bend stiffener facilitates a light-weight blade design. Further, required external over-laminations are reduced, while draping of UD layers around the bend can be avoided or at least reduced.

The present disclosure allows fulfilling a flatback geometry while maintaining high structural integrity. Even further, the disclosure also facilitates easier inspection of bend reinforcements as well as the potential glue joints in the stiffener integration before closing the blade.

A shell core, e.g. the first shell core and/or the second shell core, may comprise or be made from a material selected from a thermoplastic or thermoset polymer, a composite material, such as a glass fiber reinforced polymer, a foamed polymer material, and balsa wood or any combination thereof.

The first blade shell part may comprise a first intermediate laminate arranged between the first shell core and the first filling insert. A first intermediate laminate may further increase the strength of the flatback profile transition.

The second blade shell part may comprise a second intermediate laminate arranged between the second shell core and the second filling insert. A second intermediate laminate may further increase the strength of the flatback profile transition.

The outer laminate may comprise a glue surface for a trailing edge glue joint of the wind turbine blade. The present disclosure enables a trailing edge glue joint that significantly reduces the adhesive amount needed compared to conventional "triangular shaped" trailing edge glue joints.

Further, a method of manufacturing a wind turbine blade is disclosed. The method comprises arranging an outer reinforcement material for an outer laminate in a mould shell. The outer reinforcement material may comprise one or more fibre layers or mats. The fibre mats may comprise any type of reinforcement fibres suitable for reinforcing large composite structures, such as glass fibres, carbon fibres and/or aramid fibres. The fibre mats may comprise unidirectional fibres, biaxial fibres, triaxial fibres and/or randomly oriented fibres.

The method comprises arranging a shell core on the outer reinforcement material, wherein arranging a shell core, such as a first shell core and/or a second shell core, may comprise forming a bend having a bend angle, e.g. of at least 60 degrees, between a first part of the shell core and a second part of the shell core. Forming a bend having a bend angle may comprise forming a first bend in a first shell core and/or forming a second bend in a second shell core. Arranging a shell core may comprise arranging a first part of the shell core (first shell core and/or second shell core) and a second part of the shell core (first shell core and/or second shell core) at a bend angle (first bend angle and/or second bend angle), e.g. of at least 60 degrees. In one or more exemplary methods, a bend angle (first bend angle and/or second bend angle) is in the range from 80 degrees to 100 degrees.

The method comprises arranging an inner reinforcement material for an inner laminate on the shell core. The inner reinforcement material may comprise one or more fibre layers or mats. The fibre mats may comprise any type of reinforcement fibres suitable for reinforcing large composite structures, such as glass fibres, carbon fibres and/or aramid fibres. The fibre mats may comprise unidirectional fibres, biaxial fibres, triaxial fibres and/or randomly oriented fibres.

The method comprises adding resin to the inner reinforcement material and the outer reinforcement material, and curing the resin.

The method may comprise arranging a filling insert, e.g. a filling insert as described herein, between the shell core and the outer reinforcement material at the bend, e.g. by arranging a filling insert (first filling insert and/or second filling insert) on the outer reinforcement material prior to arranging the shell core (first shell core and/or second shell core) on the outer reinforcement material or by attaching the outer reinforcement material to the shell core (first shell core and/or second shell core) prior to arranging the shell core (first shell core and/or second shell core) on the outer reinforcement material. Arranging a filling insert (first filling insert and/or second filling insert) between the shell core (first shell core and/or second shell core) and the outer reinforcement material may comprise supporting or contacting the shell core (first shell core and/or second shell core), or at least a part thereof, with a first side and/or arranging a second side of the filling insert (first filling insert and/or second filling insert) facing the trailing edge of the wind turbine blade.

The first blade shell part and the second blade shell part may be joined along a trailing edge glue joint. The first blade shell part may comprise a first glue surface for the trailing edge glue joint and the second blade shell part may comprise a second glue surface for the trailing edge glue joint. The second part of the shell core, e.g. the first shell core and/or the second shell core, may at least in a first cross-section and/or a second cross-section extend to or near the trailing edge glue joint.

In one or more exemplary wind turbine blades with a first bend in the first shell core, the second part of the first shell core may extend within a distance of less than 25 cm from the second glue surface of the second blade shell part, preferably within a distance of less than 10 cm from the second glue surface of the second blade shell part.

In one or more exemplary wind turbine blades with a second bend in the second shell core, the second part of the second shell core may extend within a distance of less than 25 cm from the first glue surface of the first blade shell part, preferably within a distance of less than 10 cm from the first glue surface of the first blade shell part.

The blade shell may comprise a flatback section at the trailing edge, the flatback section extending from a first flatback distance from the root end along the longitudinal axis to a second flatback distance from the root end. The first flatback distance may be less than 2 m, preferably less than 1 m. The second flatback distance may be larger than $0.5*L$, where L is the blade length of the wind turbine blade. The flatback section may have a length in the range from $0.01*L$ to $0.70*L$, where L is the blade length of the wind turbine blade.

The disclosed method may be used for manufacture of a wind turbine blade as described herein. Features described in relation to the wind turbine blade may also appear in the method and/or vice versa.

DETAILED DESCRIPTION

Figure 2:
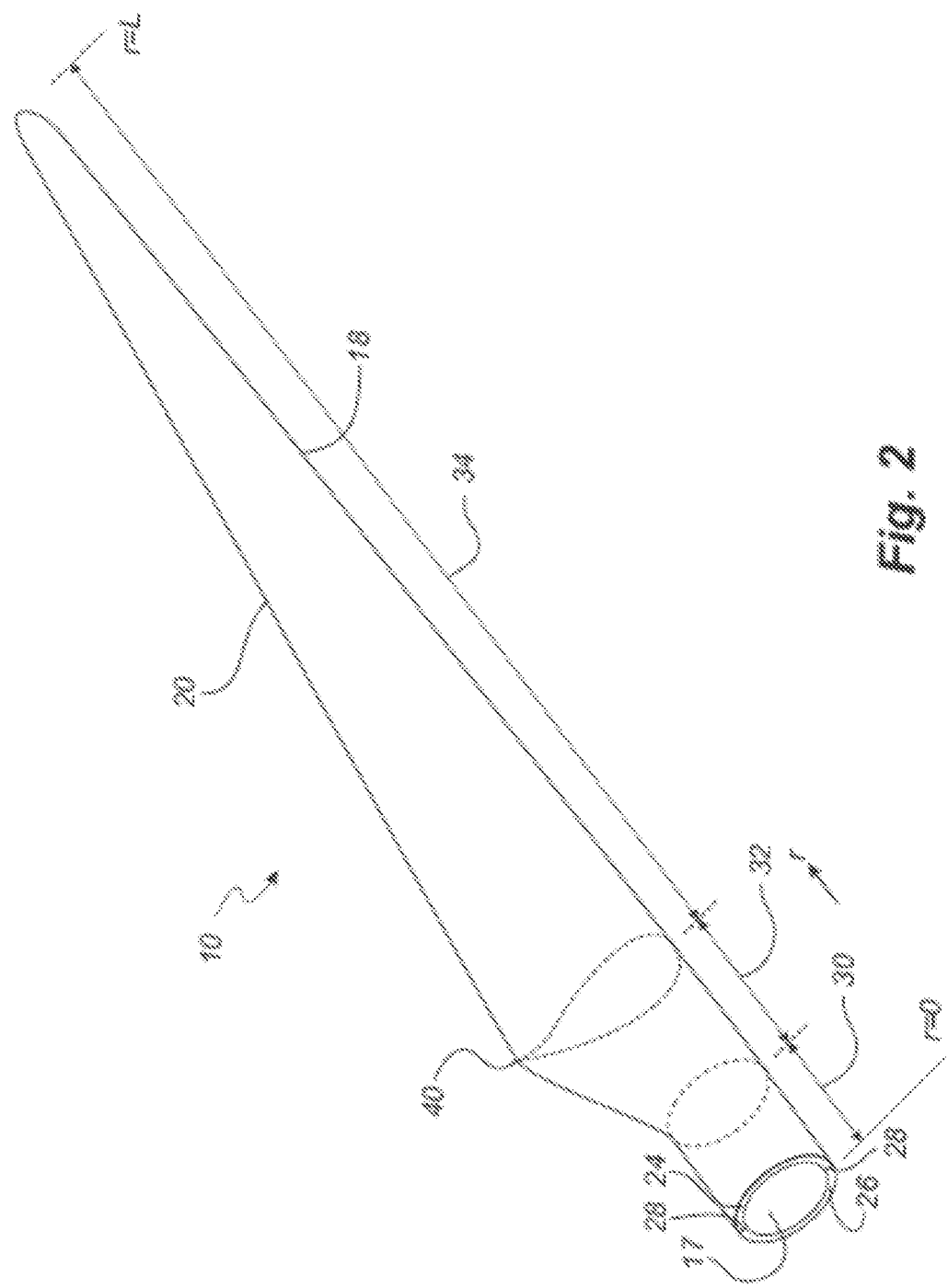
Figure 3:
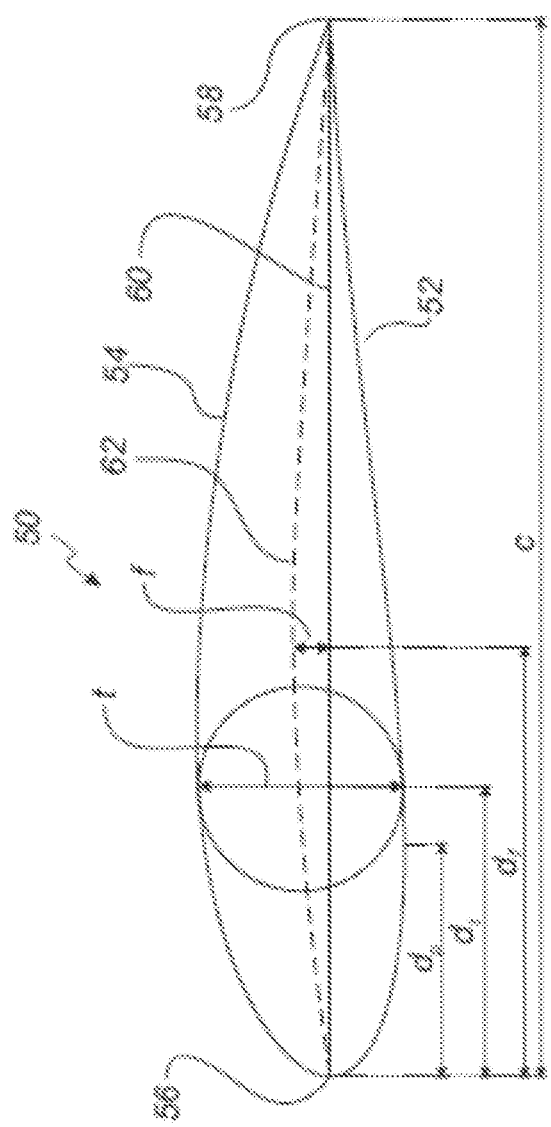
Figure 4:
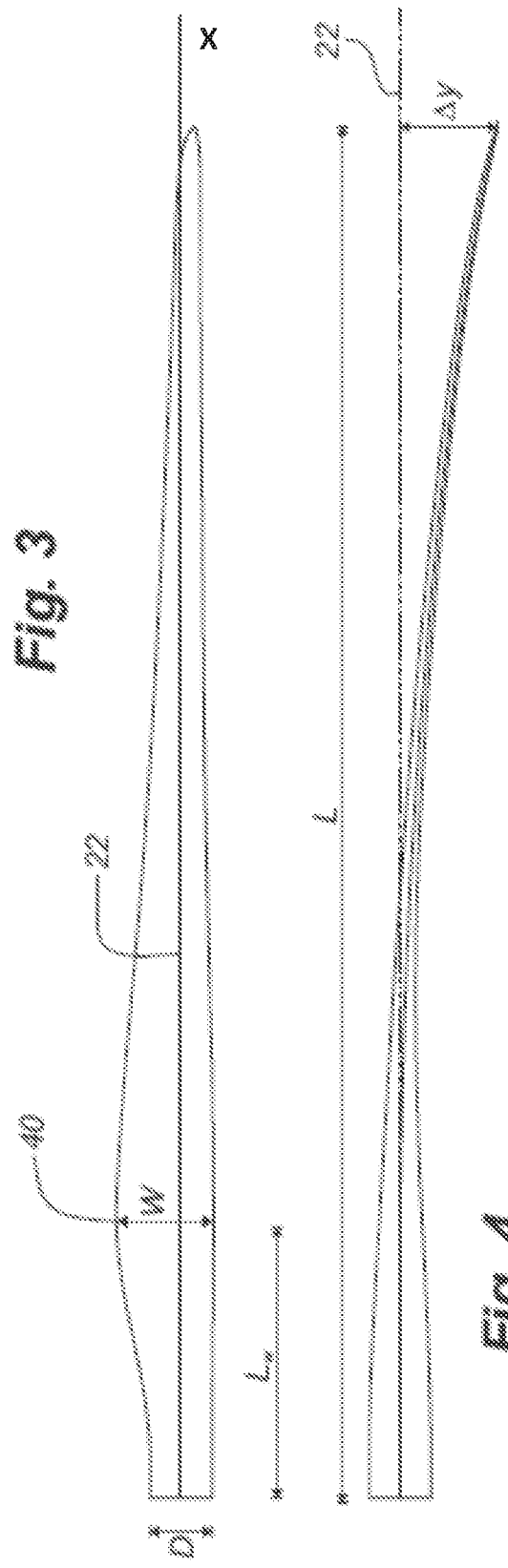
Figure 5:
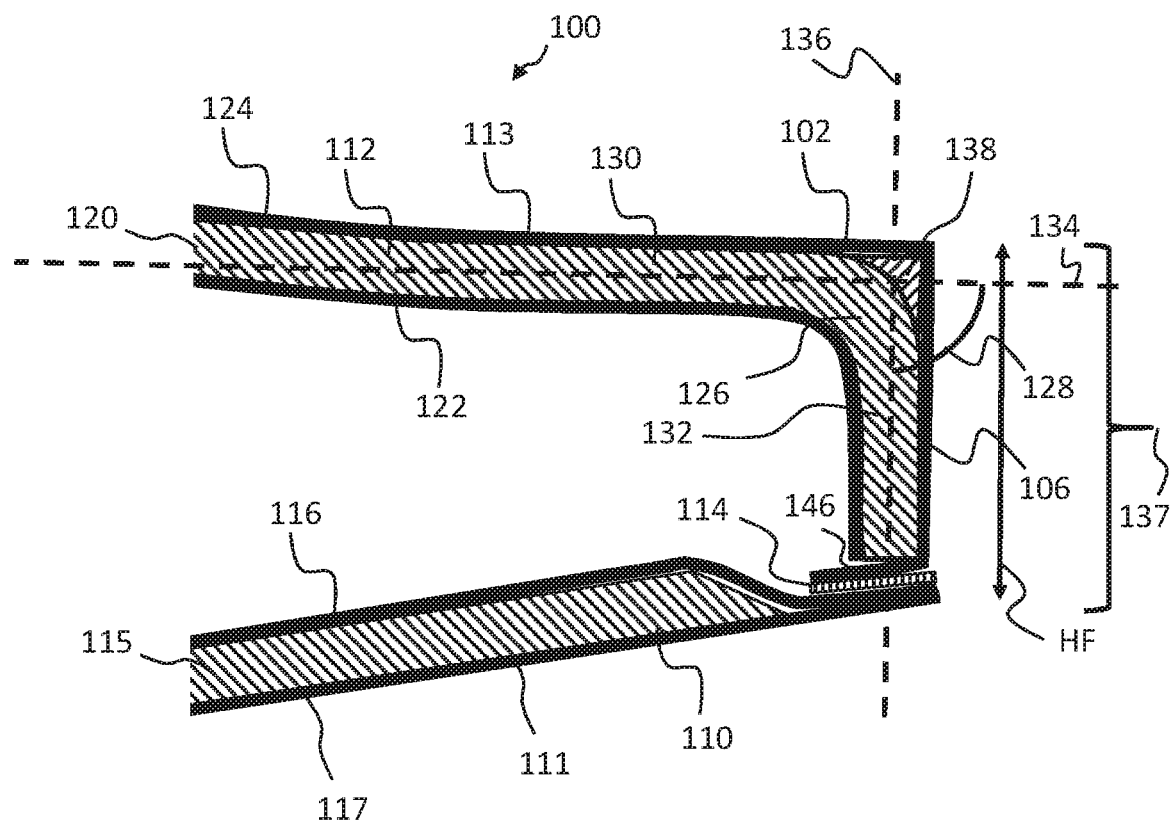
Figure 6:
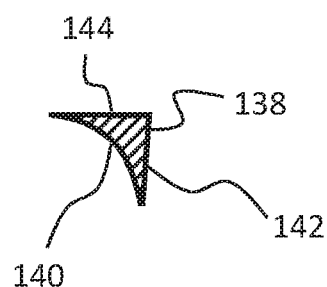

The invention is explained in detail below with reference to the drawings, in which FIG. 1 shows a wind turbine, FIG. 2 shows a schematic view of a wind turbine blade, FIG. 3 shows a schematic view of an airfoil profile, FIG. 4 shows a schematic view of a wind turbine blade, seen from above and from the side, and FIG. 5 partly shows a cross-section of an exemplary wind turbine blade according to the invention, FIG. 6 shows a cross-section of an exemplary filling insert, FIG. 7 partly shows a cross-section of an exemplary wind turbine blade according to the invention, FIG. 8 partly shows a cross-section of an exemplary wind turbine blade according to the invention, FIG. 9 partly shows a cross-section of an exemplary wind turbine blade according to the invention, FIG. 10 partly shows a cross-section of an exemplary wind turbine blade according to the invention, and FIG. 11 partly shows a cross-section of an exemplary wind turbine blade according to the invention.

The present invention relates to manufacture of wind turbine blades for horizontal axis wind turbines (HAWTs), such as upwind WTs or downwind WTs.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a shell comprising two blade shell parts made of fibre-reinforced polymer and is typically made as a pressure side or upwind blade shell part 24 and a suction side or downwind blade shell part 26 that are glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

FIGS. 3 and 4 depict parameters, which may be used to explain the geometry of blade shell parts to be manufactured according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness $t_{max}$, which is the largest diameter of the inscribed circles along the median camber line 62, the position $d_t$ of the maximum thickness $t_{max}$, and a nose radius (not shown). These parameters are typically defined as ratios to the chord length c. Thus, a local relative blade thickness $t_{max}/c$ is given as the ratio between the local maximum thickness $t_{max}$ and the local chord length c. Further, the position $d_p$ of the maximum pressure side camber may be used as a design parameter, and of course also the position of the maximum suction side camber.

FIG. 4 shows other geometric parameters of the blade and blade shell parts. The blade and blade shell parts have a total blade length L. As shown in FIG. 3, the root end is located at position r=0, and the tip end located at r=L. The shoulder 40 of the blade shell parts is located at a position $r=L_w$, and has a shoulder width W, which equals the chord length at the shoulder 40. The diameter of the root is defined as X. Further, the blade/blade shell parts is provided with a prebend, which is defined as Δy, which corresponds to the out of plane deflection from a pitch axis 22 of the blade.

FIG. 5 shows a cross-section of a trailing edge part of an exemplary wind turbine blade according to the invention. The wind turbine blade 100 comprises a profiled contour 102 with a leading edge (not shown) and a trailing edge 106 and a chord extending between the leading edge and the trailing edge 106. The wind turbine blade 100 comprises a blade shell with a first blade shell part 110 with a pressure side 111 and a second blade shell part 112 with a suction side 113, the first and second blade shell parts extending from the root end to the tip end and joined along a trailing edge glue joint 114. The first blade shell part 110 comprises a shell core denoted first shell core 115 arranged between an inner laminate or first inner laminate 116 and an outer laminate or first outer laminate 117.

The second blade shell part 112 comprises a shell core denoted second shell core 120 arranged between an inner laminate denoted second inner laminate 122 and an outer laminate denoted second outer laminate 124. The second shell core 120 comprises a second bend 126 having a second bend angle 128 of at least 60 degrees between a first part 130 of the second shell core and a second part 132 of the second shell core. The second bend angle 128 is measured as the angle between a first tangent 134 of the first part 130 and a second tangent 136 of the second part 132. In the illustrated cross-section, the second bend angle is about 90 degrees for increased aerodynamics and the second bend 126 has an inner radius less than 200 mm and an outer radius less than 200 mm.

The second blade shell part and in particular the second part 132 of the second shell core 120 forms a part of a flatback section 137 at the trailing edge 106 of the wind turbine blade 100.

Further, the second blade shell part 112 comprises a filling insert also denoted second filling insert 138 arranged between the second shell core 120 and the second outer laminate 124 at the second bend 126. In one or more exemplary wind turbine blades, the second blade shell part optionally comprises a second intermediate laminate (not shown) arranged between the second shell core 120 and the second filling insert 138. The second filling insert 138 is further described with reference to FIG. 6. The second filling insert 138 has a wedge-shaped cross-section perpendicular to the longitudinal direction. A first side 140 of the second filling insert faces contacts the second shell core 120 and contacts and/or supports on the second shell core 120. The first side 140 is optionally curved and concave to adapt to the outwardly facing surface of the second shell core 120 at the second bend 126. A second side 142 of the second filling insert 138 forms at least a part of the flatback section 137 at the trailing edge 106. The second side 142 of the second filling insert has a height of about 0.3*HF, where HF is the height of the flatback section in the illustrated cross-section. The second filling insert 138 is made of a dimensionally stable material and optionally comprises a thermoplastic polymer.

Returning to FIG. 5, the second outer laminate 124 comprises a second glue surface for the trailing edge glue joint 114 of the wind turbine blade. Further, the first inner laminate 116 comprises a first glue surface for the trailing edge glue joint 114.

Figure 7:
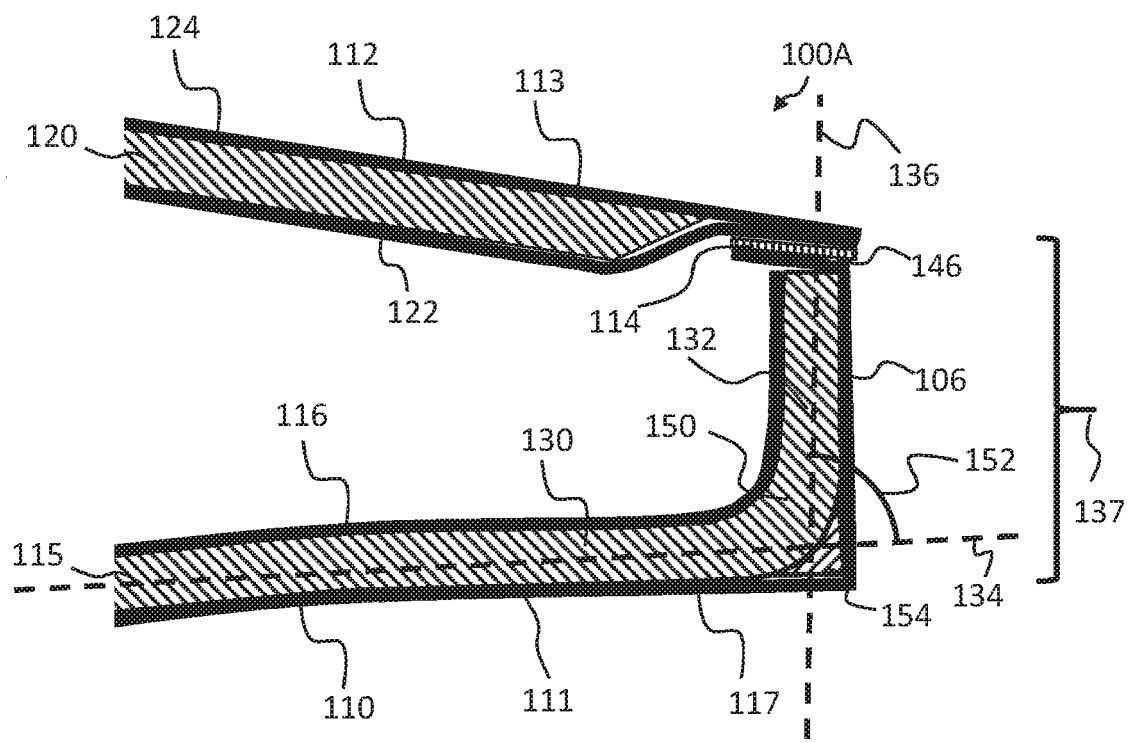

FIG. 7 shows a cross-section of a trailing edge part of an exemplary wind turbine blade according to the invention. The wind turbine blade 100A comprises a first blade shell part 110 comprising first shell core 115 arranged between first inner laminate 116 and first outer laminate 117. The first shell core 115 comprises a first bend 150 having a first bend angle 152 of at least 60 degrees between a first part 130 of the second shell core and a second part 132 of the second shell core. The first bend angle 152 is measured as the angle between a first tangent 134 of the first part 130 and a second tangent 136 of the second part 132. In the illustrated cross-section, the first bend angle is about 85 degrees for increased aerodynamics and the first bend 150 has an inner radius less than 200 mm and an outer radius less than 200 mm.

The first blade shell part and in particular the second part 132 of the first shell core 115 forms a part of a flatback section 137 at the trailing edge 106 of the wind turbine blade 100.

Further, the first blade shell part 110 comprises a filling insert also denoted first filling insert 154 arranged between the first shell core 115 and the first outer laminate 117 at the first bend 150. In one or more exemplary wind turbine blades, the first blade shell part optionally comprises a first intermediate laminate (not shown) arranged between the first shell core 115 and the first filling insert 154. The first outer laminate 117 and the second inner laminate each comprise a glue surface 146 for the trailing edge glue joint 114.

Figure 8:
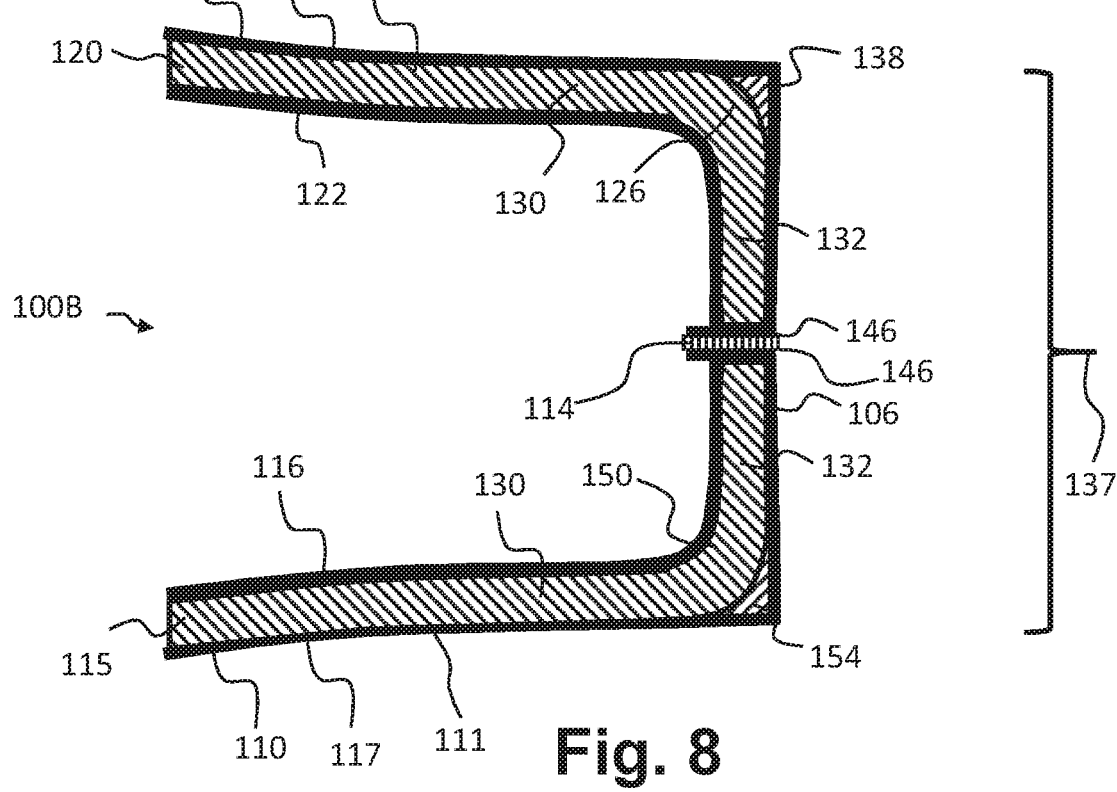

FIG. 8 shows a cross-section of a trailing edge part of an exemplary wind turbine blade according to the invention. The wind turbine blade 100B comprises a first blade shell part 110 comprising first shell core 115 arranged between first inner laminate 116 and first outer laminate 117. The first shell core 115 comprises a first bend 150 having a first bend angle of at least 60 degrees between a first part 130 of the second shell core and a second part 132 of the second shell core, see also FIG. 7. The first blade shell part 112 and in particular the second part 132 of the first shell core 115 forms a part of a flatback section 137 at the trailing edge 106 of the wind turbine blade 100.

Further, the first blade shell part 110 comprises a filling insert also denoted first filling insert 154 arranged between the first shell core 115 and the first outer laminate 117 at the first bend 150. In one or more exemplary wind turbine blades, the first blade shell part optionally comprises a first intermediate laminate (not shown) arranged between the first shell core 115 and the first filling insert 154.

The second blade shell part 112 comprises a shell core denoted second shell core 120 arranged between an inner laminate denoted second inner laminate 122 and an outer laminate denoted second outer laminate 124. The second shell core 120 comprises a second bend 126 having a second bend angle of at least 60 degrees between a first part 130 of the second shell core and a second part 132 of the second shell core, see also FIG. 5. In the illustrated cross-section, the second bend angle is about 90 degrees for increased aerodynamics and the second bend 126 has an inner radius less than 200 mm and an outer radius less than 200 mm.

The second blade shell part and in particular the second part 132 of the second shell core 120 forms a part of a flatback section 137 at the trailing edge 106 of the wind turbine blade 100.

Further, the second blade shell part 112 comprises a filling insert also denoted second filling insert 138 arranged between the second shell core 120 and the second outer laminate 124 at the second bend 126. In one or more exemplary wind turbine blades, the second blade shell part optionally comprises an intermediate laminate (not shown) arranged between the second shell core 120 and the second filling insert 138.

The first outer laminate 117 comprises a first glue surface for the trailing edge glue joint 114 and the second outer laminate 124 comprises a second glue surface for the trailing edge glue joint 114.

Figure 9:
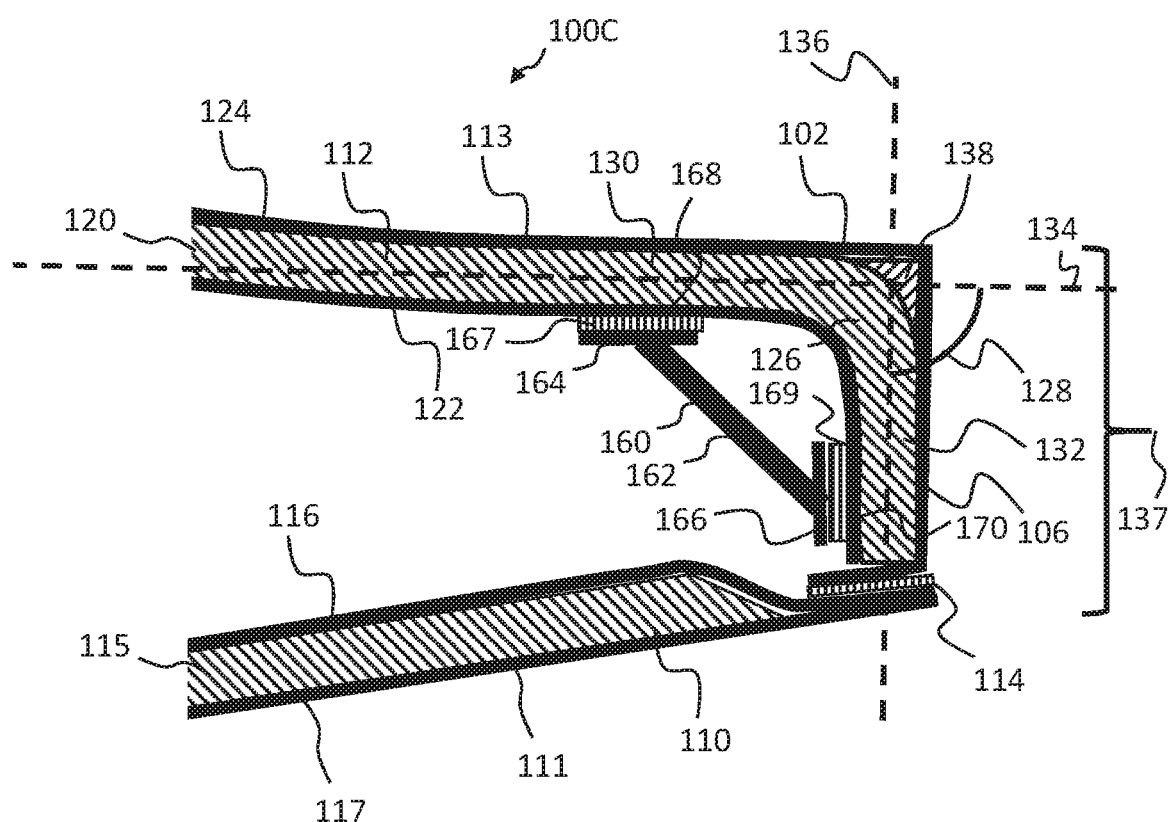

FIG. 9 shows a cross-section of a trailing edge part of an exemplary wind turbine blade according to the invention. The wind turbine blade 1000 comprises a profiled contour 102 with a leading edge (not shown) and a trailing edge 106 and a chord extending between the leading edge and the trailing edge 106. The wind turbine blade 1000 comprises a blade shell with a first blade shell part 110 with a pressure side 111 and a second blade shell part 112 with a suction side 113, the first and second blade shell parts extending from the root end to the tip end and joined along a trailing edge glue joint 114. The first blade shell part 110 comprises a shell core denoted first shell core 115 arranged between an inner laminate or first inner laminate 116 and an outer laminate or first outer laminate 117.

The second blade shell part 112 comprises a shell core denoted second shell core 120 arranged between an inner laminate denoted second inner laminate 122 and an outer laminate denoted second outer laminate 124. The second shell core 120 comprises a second bend 126 having a second bend angle 128 of at least 60 degrees between a first part 130 of the second shell core and a second part 132 of the second shell core. The second bend angle 128 is measured as the angle between a first tangent 134 of the first part 130 and a second tangent 136 of the second part 132. In the illustrated cross-section, the second bend angle is about 90 degrees for increased aerodynamics and the second bend 126 has an inner radius less than 200 mm and an outer radius less than 200 mm.

The second blade shell part and in particular the second part 132 of the second shell core 120 forms a part of a flatback section 137 at the trailing edge 106 of the wind turbine blade 100C.

Further, the second blade shell part 112 comprises a filling insert also denoted second filling insert 138 arranged between the second shell core 120 and the second outer laminate 124 at the second bend 126. The second filling insert 138 is described in detail with reference to FIGS. 5 and 6 and will not be repeated.

The wind turbine blade 100C/second blade shell part comprises a bend stiffener also denoted second bend stiffener 160. The second bend stiffener 160 is arranged on the second inner laminate 122 of the second blade shell part 112 having a second bend 126. The second bend stiffener 160 comprises a first stiffener part 162 having a first end portion 164 and a second end portion 166. The first end portion 164 comprises first glue flange attached by glue 167 to a first inner laminate portion/glue surface 168 of the inner laminate 122, the first inner laminate portion 168 partly covering the first part 130 of the second shell core 120 with the second bend 126. The first stiffener part 162 comprises a second end portion 166 with a second glue flange attached by glue 169 to a second inner laminate portion/glue surface 170 of the inner laminate 122, the second inner laminate portion 170 partly covering the second part 132 of the second shell core 120 with the second bend 126. The second bend stiffener 160 may be co-infused with the second inner laminate 122.

Figure 10:
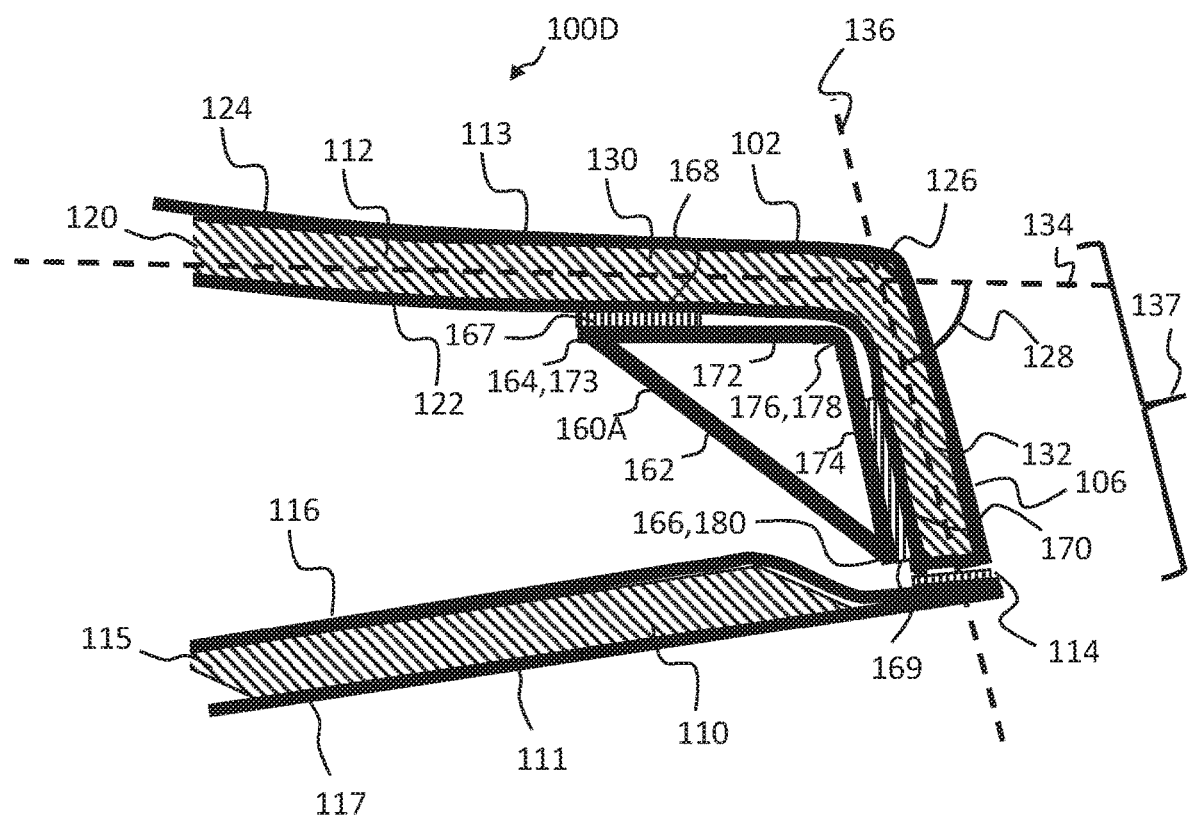

FIG. 10 shows a cross-section of a trailing edge part of an exemplary wind turbine blade according to the invention. The wind turbine blade 100D comprises a profiled contour 102 with a leading edge (not shown) and a trailing edge 106 and a chord extending between the leading edge and the trailing edge 106. The wind turbine blade 100D comprises a blade shell with a first blade shell part 110 with a pressure side 111 and a second blade shell part 112 with a suction side 113, the first and second blade shell parts extending from the root end to the tip end and joined along a trailing edge glue joint 114. The first blade shell part 110 comprises a shell core denoted first shell core 115 arranged between an inner laminate or first inner laminate 116 and an outer laminate or first outer laminate 117.

The second blade shell part 112 comprises a shell core denoted second shell core 120 arranged between an inner laminate denoted second inner laminate 122 and an outer laminate denoted second outer laminate 124. The second shell core 120 comprises a second bend 126 having a second bend angle 128 of at least 60 degrees between a first part 130 of the second shell core and a second part 132 of the second shell core. The second bend angle 128 is measured as the angle between a first tangent 134 of the first part 130 and a second tangent 136 of the second part 132. In the illustrated cross-section, the second bend angle 128 is about 75 degrees for increased aerodynamics and the second bend 126 has an inner radius less than 100 mm and an outer radius less than 100 mm.

The wind turbine blade 100D/second blade shell part 112 comprises a bend stiffener also denoted second bend stiffener 160A. The second bend stiffener 160A is arranged on the second inner laminate 122 of the second blade shell part 112 having a second bend 126. The second bend stiffener 160A comprises a first stiffener part 162 having a first end portion 164 and a second end portion 166. The second bend stiffener 160A comprises a primary stiffener part 172 having a first end portion 173 attached to first end portion 164. The second bend stiffener 160A comprises a secondary stiffener part 174 having a first end portion 176 attached to a second end portion 178 of the primary stiffener part 172. A second end portion 180 of the secondary stiffener part 174 is attached to the second end portion 166 of the first stiffener part 162.

The primary stiffener part 172 comprises first glue surface attached by glue 167 to a first inner laminate portion/glue surface 168 of the inner laminate 122, the first inner laminate portion 168 partly covering the first part 130 of the second shell core 120 with the second bend 126. The secondary stiffener part 174 comprises second glue surface attached by glue 169 to a second inner laminate portion/glue surface 170 of the inner laminate 122, the second inner laminate portion 170 partly covering the second part 132 of the second shell core 120 with the second bend 126. The second bend stiffener 160A may be co-infused with the second inner laminate 122. The second bend stiffener 160A has a wedge-shaped cross-section. A wedge-shaped bend stiffener may enable large glue surfaces.

Figure 11:
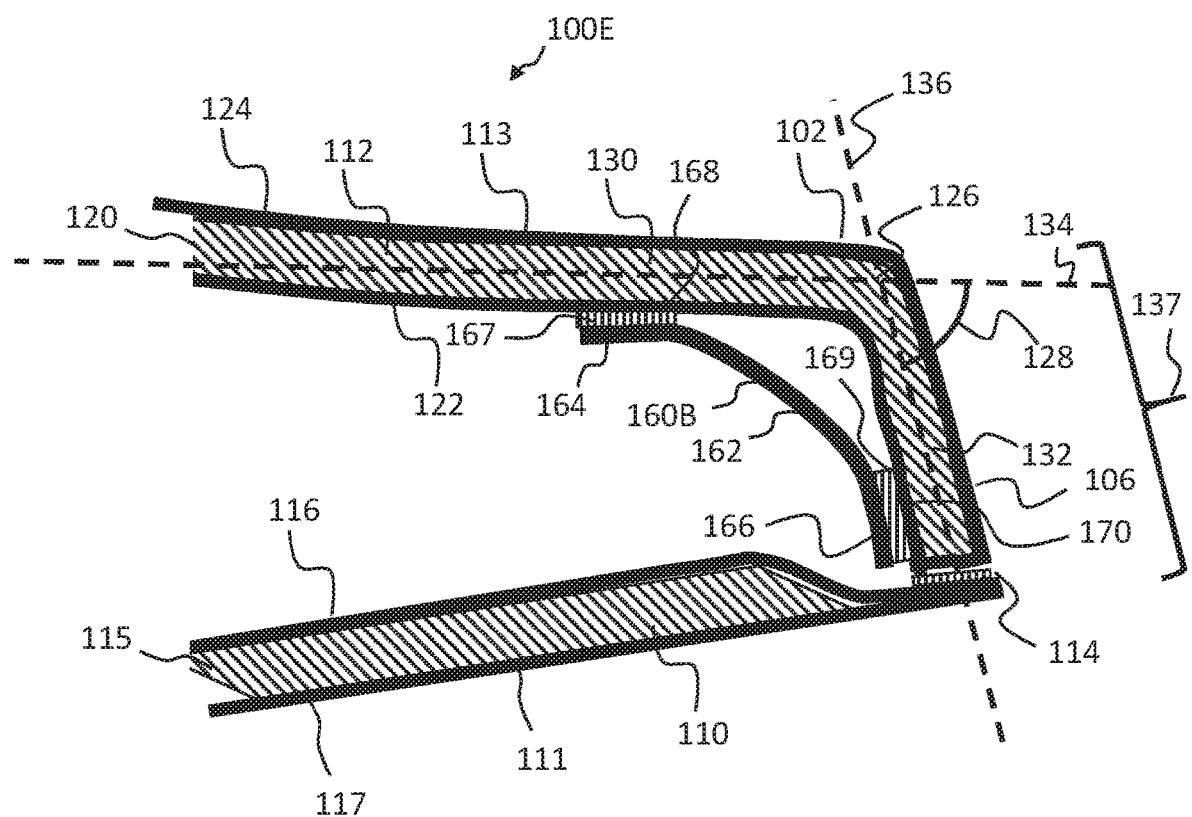

FIG. 11 shows a cross-section of a trailing edge part of an exemplary wind turbine blade according to the invention. The wind turbine blade 100E/second blade shell part 112 comprises a bend stiffener also denoted second bend stiffener 160B. The second bend stiffener 160B is arranged on the second inner laminate 122 of the second blade shell part 112 having a second bend 126. The second bend stiffener 160B comprises a curved first stiffener part 162 having a first end portion 164 and a second end portion 166. The first end portion 164 comprises first glue surface attached by glue 167 to a first inner laminate portion/glue surface 168 of the inner laminate 122, the first inner laminate portion 168 partly covering the first part 130 of the second shell core 120 with the second bend 126. The second end portion 166 comprises second glue surface attached by glue 169 to a second inner laminate portion/glue surface 170 of the inner laminate 122, the second inner laminate portion 170 partly covering the second part 132 of the second shell core 120 with the second bend 126. The second bend stiffener 160B may be co-infused with the second inner laminate 122.

It is to be understood, that first bend stiffeners similar to second bend stiffeners 160, 160A, 160B may be incorporated in the first blade shell parts of wind turbine blades illustrated in FIG. 7 and in FIG. 8, e.g. with or without filling inserts. Further, second bend stiffeners 160, 160A, 160B may be incorporated in the second blade shell part of the wind turbine blade illustrated in FIG. 8.

The invention has been described with reference to preferred embodiments. However, the scope of the invention is not limited to the illustrated embodiments, and alterations and modifications can be carried out without deviating from the scope of the invention that is defined by the following claims. The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
15 tip end section
16 blade root
17 root end face
18 leading edge
20 trailing edge
22 pitch axis
24 pressure side blade shell part/upwind blade shell part
26 suction side blade shell part/downwind blade shell part
28 bond lines/glue joints
29 horizontal
30 root region
32 transition region
34 airfoil region
50 airfoil profile
52 pressure side/upwind side
54 suction side/downwind side
56 leading edge 58 trailing edge
60 chord
62 camber line/median line
100, 100A, 100B, 100C, 100D, 100E wind turbine blade
102 profiled contour
104 leading edge
106 trailing edge
108 chord
110 first blade shell part
111 pressure side
112 second blade shell part
113 suction side
114 trailing edge glue joint
115 first shell core
116 first inner laminate
117 first outer laminate
120 second shell core
122 second inner laminate
124 second outer laminate
126 second bend
128 second bend angle
130 first part of shell core
132 second part of shell core
134 first tangent
136 second tangent
137 flatback section
138 second filling insert
140 first side of filling insert
142 second side of filling insert
144 third side of filling insert
146 glue surface
150 first bend
152 first bend angle
154 first filling insert
160 second bend stiffener
162 first stiffener part
164 first end portion
166 second end portion
167 glue
168 first inner laminate portion
169 glue
170 second inner laminate portion
172 primary stiffener part
173 first end portion of primary stiffener part
174 secondary stiffener part
176 first end portion of secondary stiffener part
178 second end portion of primary stiffener part
180 second end portion of the secondary stiffener part
c chord length
$d_t$ position of maximum thickness
$d_f$ position of maximum camber
$d_p$ position of maximum pressure side camber
f camber
$l_f$ longitudinal distance between root end frames
$l_o$ longitudinal extent of blade tip overhang
L blade length
r local radius, radial distance from blade root
t thickness
D blade root diameter
Δy prebend
X longitudinal axis
R reference axis
HF height of flatback section

The invention claimed is:

1. A wind turbine blade extending from a root end to a tip end along a longitudinal axis and comprising a root region, a transition region, and an airfoil region, the wind turbine blade comprising:
a profiled contour with a leading edge and a trailing edge and a chord extending between the leading edge and the trailing edge;
a blade shell with a first blade shell part with a pressure side and a second blade shell part with a suction side, the first and second blade shell parts extending from the root end to the tip end and joined along a trailing edge glue joint;
a first main spar cap integrated in the first blade shell part;
a second main spar cap integrated in the second blade shell part; and
one or more shear webs connected between the first main spar cap and the second main spar cap,
wherein one of the first blade shell part and the second blade shell part comprises a shell core arranged between an inner laminate and an outer laminate, wherein the shell core comprises a bend having a bend angle of at least 60 degrees between a first part of the shell core and a second part of the shell core, and
wherein a filling insert is arranged between the shell core and the outer laminate at the bend.

2. The wind turbine blade according to claim 1, wherein the bend angle is in the range from 80 degrees to 100 degrees.

3. The wind turbine blade according to claim 1, wherein the second part of the shell core forms a part of a flatback section at the trailing edge.

4. The wind turbine blade according to claim 1, wherein the second part of the shell core at least in a first cross-section and/or a second cross-section has a height of at least 0.4*HF, where HF is the height of the flatback section in the respective cross-section.

5. The wind turbine blade according to claim 1, wherein the bend has an inner radius less than 200 mm.

6. The wind turbine blade according to claim 1, wherein the bend has an outer radius less than 200 mm.

7. The wind turbine blade according to claim 1, wherein the filling insert has a wedge-shaped cross-section perpendicular to the longitudinal direction, a first side of the filling insert facing the shell core, and a second side of the filling insert forming at least a part of a flatback section at the trailing edge.

8. The wind turbine blade according to claim 7, wherein the second side of the filling insert at least in a first cross-section and/or a second cross-section has a height in the range from 0.05*HF to 0.4*HF, where HF is the height of the flatback section in the respective cross-section.

9. The wind turbine blade according to claim 1, wherein the filling insert comprises a material selected from a thermoplastic polymer, a thermoset polymer, a composite material, a foamed polymer material, and balsa wood.

10. The wind turbine blade according to claim 1, wherein the outer laminate comprises a glue surface for a trailing edge glue joint of the wind turbine blade.

11. The wind turbine blade according to claim 1, wherein a bend stiffener is arranged on the inner laminate of the first blade shell part or the second blade shell part, the bend stiffener comprising a first stiffener part having a first end portion attached to a first inner laminate portion of the inner laminate, the first stiffener part having a second end portion attached to a second inner laminate portion of the inner laminate, the first inner laminate portion partly covering the first part of the shell core and the second inner laminate portion partly covering the second part of the shell core.

12. A method of manufacturing a wind turbine blade extending from a root end to a tip end along a longitudinal axis and comprising a root region, a transition region, and an airfoil region, the wind turbine blade comprising a profiled contour with a leading edge and a trailing edge and a chord extending between the leading edge and the trailing edge, a blade shell with a pressure side and a suction side joined along a trailing edge glue joint, a first main spar cap integrated in the pressure side of the blade shell, a second main spar cap integrated in the suction side of the blade shell, and one or more shear webs connected between the first main spar cap and the second main spar cap, the method comprising:
- arranging an outer reinforcement material for an outer laminate in a mould shell;
- arranging a shell core on the outer reinforcement material, wherein arranging a shell core comprises forming a bend having a bend angle of at least 60 degrees between a first part of the shell core and a second part of the shell core;
- arranging a filling insert between the shell core and the outer reinforcement material at the bend;
- arranging an inner reinforcement material for an inner laminate on the shell core;
- adding resin to the inner reinforcement material and the outer reinforcement material; and
- curing the resin.

13. A wind turbine blade extending from a root end to a tip end along a longitudinal axis and comprising a root region, a transition region, and an airfoil region, the wind turbine blade comprising:

- a profiled contour with a leading edge and a trailing edge and a chord extending between the leading edge and the trailing edge;
- a blade shell with a first blade shell part with a pressure side and a second blade shell part with a suction side, the first and second blade shell parts extending from the root end to the tip end and joined along a trailing edge glue joint;
- a first main spar cap integrated in the first blade shell part;
- a second main spar cap integrated in the second blade shell part; and
- one or more shear webs connected between the first main spar cap and the second main spar cap, wherein one of the first blade shell part and the second blade shell part comprises a shell core arranged between an inner laminate and an outer laminate, wherein the shell core comprises a bend having a bend angle of at least 60 degrees between a first part of the shell core and a second part of the shell core, and wherein a bend stiffener is arranged on the inner laminate of the first blade shell part or the second blade shell part, the bend stiffener comprising a first stiffener part having a first end portion attached to a first inner laminate portion of the inner laminate, the first stiffener part having a second end portion attached to a second inner laminate portion of the inner laminate, the first inner laminate portion partly covering the first part of the shell core and the second inner laminate portion partly covering the second part of the shell core.

* * * * *